United States Patent
Aleksic et al.

(10) Patent No.: US 12,181,297 B2
(45) Date of Patent: Dec. 31, 2024

(54) METHOD FOR ENABLING A ROUTE

(71) Applicant: MERCEDES-BENZ GROUP AG, Stuttgart (DE)

(72) Inventors: Mario Aleksic, Stuttgart (DE); Stefan Maisenbacher, Santa Clara, CA (US)

(73) Assignee: MERCEDES-BENZ GROUP AG, Stuttgart (DE)

( * ) Notice: Subject to any disclaimer, the term of this patent is extended or adjusted under 35 U.S.C. 154(b) by 256 days.

(21) Appl. No.: 17/776,325

(22) PCT Filed: Sep. 28, 2020

(86) PCT No.: PCT/EP2020/077132
§ 371 (c)(1),
(2) Date: May 12, 2022

(87) PCT Pub. No.: WO2021/094029
PCT Pub. Date: May 20, 2021

(65) Prior Publication Data
US 2022/0397409 A1 Dec. 15, 2022

(30) Foreign Application Priority Data
Nov. 13, 2019 (DE) .................. 10 2019 007 861.6

(51) Int. Cl.
*B60W 60/00* (2020.01)
*G01C 21/00* (2006.01)
*G01C 21/34* (2006.01)

(52) U.S. Cl.
CPC ....... *G01C 21/3476* (2013.01); *B60W 60/001* (2020.02); *G01C 21/3484* (2013.01)

(58) Field of Classification Search
CPC .................. G01C 21/3476; G01C 21/3484; G01C 21/30; G01C 21/3644; G01C 21/3804;
(Continued)

(56) References Cited

U.S. PATENT DOCUMENTS 6,526,345 B2  2/2003 Ryoo
9,630,616 B2  4/2017 Reichel et al.
(Continued)

FOREIGN PATENT DOCUMENTS

CN  107643086 A  1/2018
CN  108688666 A  10/2018
(Continued)

OTHER PUBLICATIONS

Office Action dated May 9, 2023 in related/corresponding JP Application No. 2022-528147.
(Continued)

*Primary Examiner* — Khoi H Tran
*Assistant Examiner* — Tien Minh Le
(74) *Attorney, Agent, or Firm* — PATENT PORTFOLIO BUILDERS PLLC

(57) ABSTRACT

A method for enabling a route for automated driving operation of a vehicle involves enabling a route ahead of the vehicle for automated driving operation of the vehicle if it is determined, using a digital map, which is used during automated driving operation for landmark-based localization of the vehicle, that there are landmarks present along the route which, with regard to their suitability for longitudinal and transverse localization of the vehicle, fulfil requirements which are predefined according to a course of the route.

4 Claims, 1 Drawing Sheet

(58) Field of Classification Search
CPC .......... B60W 60/001; B60W 2556/50; B60W 60/005
See application file for complete search history.

(56) References Cited

U.S. PATENT DOCUMENTS

| | | | |
|---|---|---|---|
| 10,310,508 | B2 | 6/2019 | Kunisa et al. |
| 10,942,517 | B2 | 3/2021 | Koda et al. |
| 2011/0118979 | A1 | 5/2011 | Mao et al. |
| 2017/0307397 | A1* | 10/2017 | Sorstedt ................. G05D 1/024 |
| 2018/0151066 | A1* | 5/2018 | Oba .................. B60W 60/0059 |
| 2020/0005058 | A1* | 1/2020 | Mielenz ............... G06V 20/584 |
| 2020/0273197 | A1* | 8/2020 | Zhao ......................... E01F 9/30 |
| 2020/0348145 | A1* | 11/2020 | Paranjpe .............. G01C 21/367 |
| 2020/0385014 | A1* | 12/2020 | Hanniel ............. G01C 21/3815 |
| 2021/0009107 | A1 | 1/2021 | Ries et al. |
| 2022/0212717 | A1* | 7/2022 | Saito ...................... G08G 1/167 |

FOREIGN PATENT DOCUMENTS

| | | |
|---|---|---|
| CN | 109211255 A | 1/2019 |
| DE | 102012016802 A1 | 2/2014 |
| DE | 102014013672 A1 | 4/2015 |
| DE | 102016224042 A1 | 6/2018 |
| DE | 102017004118 A1 | 10/2018 |
| EP | 3236212 A1 | 10/2017 |
| JP | 2008249639 A | 10/2008 |
| JP | 2009162518 A | 7/2009 |
| JP | 2018030495 A | 3/2018 |
| JP | 2019174191 A | 10/2019 |
| WO | 2016152873 A1 | 9/2016 |
| WO | 2018212294 A1 | 11/2018 |

OTHER PUBLICATIONS

International Search Report mailed Feb. 1, 2021 in related/corresponding International Application No. PCT/EP2020/077132.
Office Action created Jun. 19, 2020 in related/corresponding DE Application No. 10 2019 007 861.6.
Written Opinion mailed Feb. 1, 2021 in related/corresponding International Application No. PCT/EP2020/077132.
Office Action dated Aug. 7, 2024 in related/corresponding KR Application No. 10-2022-7019878.
Office Action dated Sep. 26, 2024 in related/corresponding CN Application No. 202080078723.7.

* cited by examiner

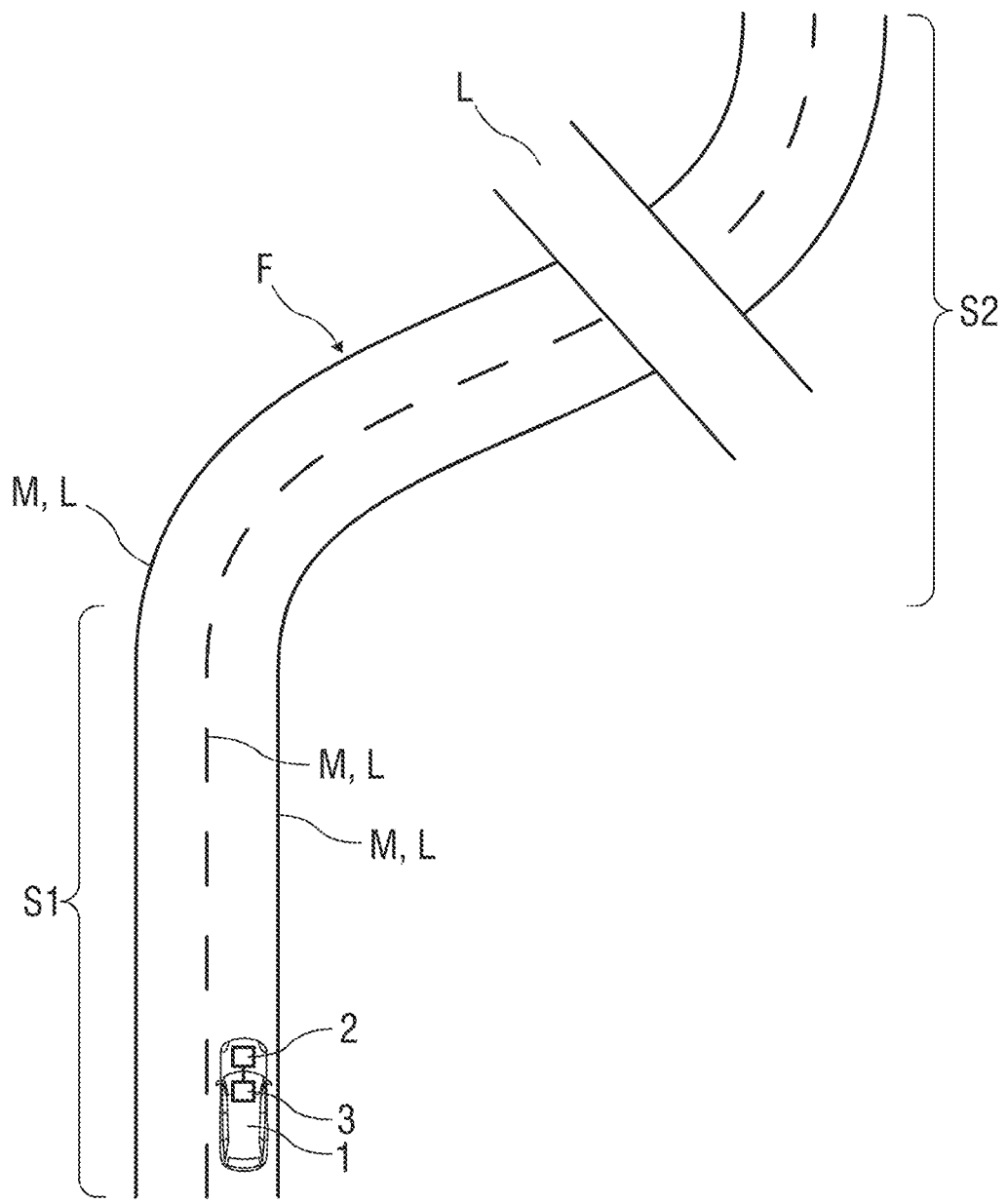

METHOD FOR ENABLING A ROUTE

BACKGROUND AND SUMMARY OF THE INVENTION

Exemplary embodiments of the invention relate to a method for enabling a route for automated driving operation of a vehicle.

US 2011/0118979 A1 discloses a method for operating a vehicle location system, wherein a warning is issued in a timely manner when the vehicle location system cannot satisfactorily meet predefined performance criteria. The method comprises determining a satellite-based position estimate, determining a dead reckoning position estimate, determining a location estimate by combining the satellite-based position estimate and the dead reckoning position estimate, determining a map matching position, and determining the integrity of a location determination by comparing a test statistic. The test statistic is calculated by evaluating the map matching position and the position estimate, wherein a decision threshold value is predefined based on a predefined location estimation accuracy specification. If the test statistic is greater than the decision threshold, the vehicle location system provides an indication that the integrity of the position estimate does not meet the predefined location estimation accuracy specification.

Exemplary embodiments of the invention are directed to a method for enabling a route for automated driving operation of a vehicle, which method is improved compared to the prior art.

According to the invention, a method for enabling a route for automated driving operation of a vehicle provides that a route ahead of the vehicle is enabled for automated driving operation of the vehicle if it is determined by means of a digital map, which is used during automated driving operation for landmark-based localization of the vehicle, that there are landmarks present along the route which, with regard to their suitability for longitudinal and transverse localization of the vehicle, fulfil requirements that are predefined according to a course of the route.

By applying the method, automated driving operation of the vehicle is possible if, for example, a roadway edge is relatively well marked on a straight section of road and if there is a sufficient number of landmarks for transverse localization of the vehicle.

In one embodiment of the method, information about the route is determined from the digital map and, based on this information, the route is divided into straight route sections and curved route sections. In particular, the division into straight and curved route sections is carried out because the landmarks are used to distinguish whether these route sections are suitable for longitudinal localization or transverse localization or both.

In a further embodiment of the method, landmarks located along the route are determined as further information based on the digital map. In particular, the landmarks are determined as further information so that it can be determined whether the route or at least route sections is or are suitable for automated driving operation of the vehicle.

For this purpose, in a further development, the landmarks are analyzed with regard to their suitability for longitudinal and transverse localization of the vehicle, wherein it is determined by means of the analysis whether safe automated driving operation of the vehicle is possible on the route or at least a section thereof with corresponding landmarks. For this purpose, a distance between the individual landmarks can also be determined, for example.

In one embodiment of the method, automated driving operation of the vehicle is enabled for a straight route section when it is determined that there are a predefined number of landmarks along the straight route section that are suitable for transverse localization of the vehicle so that safe automated driving operation of the vehicle is possible on that straight line section of the route.

In a further embodiment, automated driving operation of the vehicle is enabled for a curved route section when it is determined that a predefined number of landmarks suitable for transverse localization and longitudinal localization of the vehicle are located along the curved route section in order to enable automated driving operation of the vehicle.

In particular, in a possible development of the method, at least one peripheral structure of the roadway is or are detected as landmarks for a transverse localization of the vehicle, wherein a certain number of peripheral structures must be present along the route to enable the automated driving operation.

A possible further embodiment of the method provides that at least one bridge crossing a roadway without bridge piers is detected as landmarks for longitudinal localization of the vehicle. In this case, such a landmark is determined, in particular as further information, by means of the digital map in order to enable automated driving operation of the vehicle on the corresponding route section.

Based on localization accuracy of the vehicle and depending on the route section, a maximum driving speed of the vehicle for the enabled automated driving operation can be specified in a further design. In this way, it can be ensured to the greatest possible extent that the vehicle is travelling at a speed appropriate for the route section during the enabled automated driving operation. In this way, it can be ensured to the greatest possible extent that the vehicle does not pose a danger to itself or to road users in the immediate vicinity of the vehicle during the enabled automated driving operation.

Exemplary embodiments of the invention are explained in more detail below with reference to a drawing.

BRIEF DESCRIPTION OF THE DRAWING FIGURE

In the drawing:

The sole FIGURE shows schematically a vehicle and a route ahead of the vehicle.

DETAILED DESCRIPTION

The single FIGURE shows, in a highly simplified form, a vehicle 1 and a route F is shown ahead of the vehicle 1.

The vehicle 1 has an assistance system 2 for automated driving operation, in which a driving task of the vehicle 1 is fully performed by the vehicle 1 so that a vehicle user, i.e., a driver, can perform other activities during the automated driving operation.

For automated, in particular highly automated, driving operation, an exact determination of the position of the vehicle 1 is required, wherein a satellite-based position determination unit is arranged in the vehicle 1 for this purpose. However, a position determination signal from a satellite is not sufficient to carry out automated driving operation.

In order to enable a route F for automated driving operation of the vehicle 1, a method described below is provided.

A route F is released for automated driving of the vehicle 1 if landmarks L are stored along the route F in a digital map 3, which is used for landmark-based localization of the vehicle 1, and fulfil certain requirements with regard to their suitability for longitudinal localization and transverse localization of the vehicle 1.

These requirements are specified depending on the course of the route F, since there are different requirements for the accuracy of the longitudinal localization and transverse localization of the vehicle 1 for straight route sections S1 and curved route sections S2.

For this purpose, information about the route F is determined using a digital map 3 available to the vehicle 1, wherein the route F is divided into straight route sections S1 and curved route sections S2 using this information.

In addition, further information about landmarks L located along the route F is taken from the digital map 3. In particular, lane markings and peripheral structures are recorded as landmarks L in the digital map 3.

Once the landmarks L have been detected, they are analyzed with regard to their suitability for longitudinal localization and for transverse localization of the vehicle 1. For example, a solid lane marking M at the roadway edge is only suitable for transverse localization, i.e., for transverse positioning of the vehicle 1.

A bridge crossing the route F, in particular the roadway, on the other hand, is suitable as a landmark L only for longitudinal localization of the vehicle 1.

If the route F is analyzed with regard to the landmarks L, automated driving operation is enabled or not.

In particular, automated driving operation is enabled for the vehicle 1 if there are landmarks L along the straight route section S1 suitable for transverse localization of the vehicle 1 and which are present in a sufficient number along the straight route section S1.

In addition, automated driving operation is enabled for the vehicle 1 if there are landmarks L along the curved route section S2 that are suitable for longitudinal localization and for transverse localization of the vehicle 1 and are present in a sufficient number along the curved route section S2 for longitudinal localization and for transverse localization. In particular, landmarks L are required for longitudinal localization of the vehicle 1 on a curved route section S2 in order to rule out the possibility, as far as possible, that the vehicle 1 leaves the roadway unintentionally during automated driving operation.

By applying the method, it is possible that automated driving operation of the vehicle 1 is enabled on a straight road section S1 with comparatively good lane marking M at the edge of the road, as long as landmarks L are available in sufficient number for transverse localization of the vehicle 1.

An assumed localization accuracy decreases with a length of a travelled route without new landmarks L as localization objects. If, for example, lampposts of a road lighting system are present at a comparatively short distance before a curved route section S2, the curved route section S2 can be travelled automatically, even if no further landmarks L are present within the curved route section S2.

The localization accuracy can also be used to derive and specify a comfortable maximum drivable driving speed for the automated driving operation of the vehicle 1 depending on the route section S1, S2.

If the vehicle 1 drives on a relatively free straight route section S1 without landmarks L for longitudinal localization of the vehicle 1 and a curved route section S2 follows, a bend can be driven through with reduced driving speed, wherein this driving speed is also dependent on the curvature of the bend. If the driving speed is not significantly lower than that with which the bend would be driven through in manual driving operation, the driven driving speed of the vehicle 1 is acceptable for a relatively short section of the curved route section S2.

On sections of curved sections S2 of a route F that cannot be driven on at an acceptable, i.e., lower, driving speed, posts can be positioned, in particular built, as landmarks L at the roadway edge as edge structures in order to allow automated driving operation of the vehicle 1 there.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method, comprising:
   determining, using a digital map used during automated driving operation for landmark-based localization of a vehicle, information about a route from a digital map along with a vehicle will travel;
   dividing the route into straight route sections and curved route sections based on the information about the route determined from the digital map;
   determining, based on the digital map, a plurality of landmarks along the route;
   determining, for each of the plurality of determined landmarks, whether the respective one of the plurality of landmarks is only suitable for longitudinal localization of the vehicle, is only suitable for transverse localization of the vehicle, or is suitable for both longitudinal and transverse localization of the vehicle;
   determining, for each of the straight route sections, whether there are at least a predetermined number of the plurality of landmarks along the respective straight route section that are suitable for transverse localization of the vehicle;
   determining, for each of the curved route sections, whether there are at least a predetermined number of the plurality of landmarks along the respective curved route section that are suitable for both longitudinal and transverse localization of the vehicle;
   enabling the automated driving operation of the vehicle along the respective curved route sections having at least the predetermined number of the plurality of landmarks along the respective curved route section that suitable for both the longitudinal and transverse localization of the vehicle; and
   enabling the automated driving operation of the vehicle along the respective straight route sections having at least the predetermined number of the plurality of landmarks along the respective straight route section that are suitable for at least the transverse localization of the vehicle.

2. The method of claim 1, wherein at least one roadway marking or lighting unit of a road lighting system are detected as landmarks for a transverse localization of the vehicle.

3. The method of claim 1, wherein at least one bridge crossing a roadway without bridge piers or lighting unit of a road lighting system is detected as landmarks for longitudinal localization of the vehicle.

4. The method of claim 1, further comprising:
specifying a maximum driving speed of the vehicle for the automated driving operation based on a localization accuracy of the vehicle and depending on the route section.

* * * * *